(12) United States Patent
Pons et al.

(10) Patent No.: US 11,084,331 B2
(45) Date of Patent: Aug. 10, 2021

(54) WINTER TIRE STUD

(71) Applicant: The Goodyear Tire & Rubber Company, Akron, OH (US)

(72) Inventors: Frederic Michel-Jean Pons, Thionville (FR); Arnaud Caron, Signeulx (BE); Damian Wilhelm Georges, Mullendorf (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 367 days.

(21) Appl. No.: 16/223,693

(22) Filed: Dec. 18, 2018

(65) Prior Publication Data

US 2020/0189325 A1 Jun. 18, 2020

(51) Int. Cl.
*B60C 11/16* (2006.01)

(52) U.S. Cl.
CPC ...... *B60C 11/1656* (2013.01); *B60C 11/1675* (2013.01)

(58) Field of Classification Search
CPC . B60C 11/1675; B60C 11/14; B60C 11/1643; B60C 11/1637; B60C 11/165; B60C 11/1693
See application file for complete search history.

(56) References Cited

U.S. PATENT DOCUMENTS

| | | | | |
|---|---|---|---|---|
| 862,435 A * | 8/1907 | Bartel | ............... | B60C 11/16 152/210 |
| 1,065,949 A * | 7/1913 | Lorme | ............... | B60C 11/16 152/210 |
| 1,361,078 A | 12/1920 | Henry | | |
| 2,217,122 A | 10/1940 | Lowry | | |
| 3,179,146 A | 4/1965 | Edsmar | | |

(Continued)

FOREIGN PATENT DOCUMENTS

| | | | |
|---|---|---|---|
| DE | 3739422 A1 | 5/1988 | |
| DE | 102009052741 A1 * | 5/2010 | ........... B60C 11/165 |

(Continued)

OTHER PUBLICATIONS

European Search Report for Serial No. EP19216975 dated May 6, 2020.

*Primary Examiner* — Jacob T Minskey
*Assistant Examiner* — Virak Nguon
(74) *Attorney, Agent, or Firm* — Robert N. Lipcsik

(57) ABSTRACT

A stud is inserted into a tread portion of a tire. The first stud includes a tip end protruding from the tread portion for contacting a surface, the tip end comprising a radially outer portion with a first surface, a second surface, a third surface, a fourth surface, a fifth surface, a sixth surface, and a seventh surface, the first surface defining an irregular quadrilateral and extending radially inward from the fourth surface toward a planar side of the tip end; and a base including a flanged bottom portion provided on an end opposite the tip end and extending radially outward, a stump portion provided between the bottom portion and the tip end, and a shank portion interconnecting the stump portion and the bottom portion, the base being embedded and secured in the tread portion of the tire in which the first stud is installed, the bottom portion having a tear-drop shape comprising three planar sides and one semi-cylindrical side.

13 Claims, 3 Drawing Sheets

(56) References Cited

U.S. PATENT DOCUMENTS

| | | |
|---|---|---|
| 3,258,835 A | 7/1966 | Boggild et al. |
| 3,672,421 A | 6/1972 | Anderson |
| 3,837,386 A | 9/1974 | Lejeune |
| 3,872,908 A | 3/1975 | Einarsson |
| 3,942,572 A | 3/1976 | Crandall |
| 4,036,272 A | 7/1977 | Lee |
| 4,619,301 A | 10/1986 | Hiroki |
| 4,838,329 A | 6/1989 | Ohuchi et al. |
| 5,164,027 A | 11/1992 | Omi |
| 5,198,048 A | 3/1993 | Hojo |
| 5,221,379 A | 6/1993 | Nicholas |
| 5,324,369 A | 6/1994 | Yamada |
| 5,603,367 A | 2/1997 | Watanabe |
| 5,609,700 A | 3/1997 | West |
| 5,707,463 A | 1/1998 | Hansen |
| 5,800,649 A | 9/1998 | Eromaki |
| 6,374,886 B1 | 4/2002 | Eromaki |
| 6,779,571 B1 | 8/2004 | Kasparov |
| 7,338,571 B2 | 3/2008 | Brivio et al. |
| 10,035,382 B2 | 7/2018 | Matsumoto |
| 2006/0213595 A1 | 9/2006 | Volt et al. |
| 2007/0144646 A1 | 6/2007 | Mancia et al. |
| 2016/0159164 A1 * | 6/2016 | Matsumoto ......... B60C 11/1637 152/210 |

FOREIGN PATENT DOCUMENTS

| | | |
|---|---|---|
| RU | 2148498 C1 | 5/2000 |
| WO | WO9015725 A1 | 12/1990 |
| WO | WO2008130275 A1 | 10/2008 |
| WO | WO-2015139860 A1 * | 9/2015 ......... B60C 11/1675 |
| WO | 2018078937 A1 | 5/2018 |
| WO | WO-2018078940 A1 * | 5/2018 ............. B60C 11/16 |

* cited by examiner

WINTER TIRE STUD

FIELD OF INVENTION

The present invention relates to stud pins installed in a tread portion of a pneumatic tire and, more particularly, to a pneumatic tire equipped with the stud pins.

BACKGROUND OF THE INVENTION

Conventional snow tires may be equipped with stud pins installed in the tread portion of the tire to allow the tire to grip an icy or snowy road surface. A stud pin may be embedded into a stud pin installation hole provided in the tread portion of the tire. The stud pin may broaden a pin bore and be tightly embedded therein so that the stud pin does not fall out of the stud pin installation hole due to braking, driving, or lateral and vertical forces received from the road surface while the tire is rotating.

The stud pin may have a pillar and a pin. The pillar may be fitted into a close-ended hole formed in the tread portion of the tire and thereby be secured to the tread surface. The pin may protrude radially outward from the pillar. The pillar may be asymmetrically and/or irregularly shaped as it extends radially outward from the tread portion.

When these studded snow tires are used on concrete or asphalt road surfaces not coved by snow or ice, these harder, bare road surfaces may dislodge the stud pins. Even for tires equipped with the above-mentioned stud pins, there are cases where the stud pins often fall out (pin drop) due to the forces on the tire while a vehicle is driving, braking, and/or cornering on a concrete or asphalt road. There will be a large amount of pin drop if there is any clawing force applied between the stud pin and the road surface. The clawing force may overcome the force retaining the stud pin in the tread rubber material of the tire. Therefore, there is a demand for further improvement regarding pin drop for these pneumatic stud tires, as well as, the other performance characteristics of the stud pins (e.g., traction, durability, wear, etc.).

SUMMARY OF THE INVENTION

A first stud, in accordance with the present invention, is inserted into a tread portion of a tire. The first stud includes a tip end protruding from the tread portion for contacting a surface, the tip end comprising a radially outer portion with a first surface, a second surface, a third surface, a fourth surface, a fifth surface, a sixth surface, and a seventh surface, the first surface defining an irregular quadrilateral and extending radially inward from the fourth surface toward a planar side of the tip end; and a base including a flanged bottom portion provided on an end opposite the tip end and extending radially outward, a stump portion provided between the bottom portion and the tip end, and a shank portion interconnecting the stump portion and the bottom portion, the base being embedded and secured in the tread portion of the tire in which the first stud is installed, the bottom portion having a tear-drop shape comprising three planar sides and one semi-cylindrical side.

According to another aspect of the first stud, the second surface defines an irregular quadrilateral and extends radially inward from the first surface toward the vertical hollow of the tip end.

According to still another aspect of the first stud, the third surface defines an irregular quadrilateral and extends radially inward from the first surface toward a vertical hollow of the tip end.

According to yet another aspect of the first stud, the fourth surface defines an irregular pentagon and extends radially inward from the first surface toward a vertical hollow of the tip end.

According to still another aspect of the first stud, the fifth surface defines an irregular pentagon and extends radially inward from the first, second, and third surfaces toward a planar side of the tip end and two vertical hollows of the tip end.

According to yet another aspect of the first stud, the sixth surface defines an irregular pentagon and extends radially inward from the second surface toward a planar side of the tip end and two vertical hollows of the tip end.

According to still another aspect of the first stud, the seventh surface defines an irregular pentagon and extends radially inward from the third surface toward a planar side of the tip end and two vertical hollows of the tip end.

According to yet another aspect of the first stud, the bottom portion has a "saucer" configuration with an inclined surface extending radially inward from sides of the bottom portion and away from the tip end, the inclined surface having a tear-drop shape.

According to still another aspect of the first stud, the bottom portion has a configuration such that an inclined surface extends radially inward from sides of the bottom portion and away from the tip end.

A second stud, in accordance with the present invention, is inserted into a tread portion of a tire. The second stud includes a tip end protruding from the tread portion for contacting a surface; and a base including a flanged bottom portion provided on an end opposite the tip end and extending radially outward, a stump portion provided between the bottom portion and the tip end, and a shank portion interconnecting the stump portion and the bottom portion. The base is embedded and secured in the tread portion of the tire in which the second stud is installed. The bottom portion has a tear-drop shape comprising three planar sides and one semi-cylindrical side. The bottom portion of the base has a "saucer" configuration such that an inclined surface extends radially inward from vertical sides of the bottom portion away from the tip end such that the inclined surface takes on the tear-drop shape of the bottom portion.

According to another aspect of the second stud, the second stud further includes a first surface and a second surface. The second surface defines an irregular quadrilateral and extends radially inward from the first surface toward the vertical hollow of the tip end.

According to still another aspect of the second stud, the second stud further includes a first surface, a second surface, and a third surface. The third surface defines an irregular quadrilateral and extends radially inward from the first surface toward a vertical hollow of the tip end.

According to yet another aspect of the second stud, the second stud further includes a first surface, a second surface, a third surface, and a fourth surface. The fourth surface defines an irregular pentagon and extends radially inward from the first surface toward a vertical hollow of the tip end.

According to still another aspect of the second stud, the second stud further includes a first surface, a second surface, a third surface, a fourth surface, and a fifth surface. The fifth surface defines an irregular pentagon and extends radially inward from the first, second, and third surfaces toward a planar side of the tip end and two vertical hollows of the tip end.

According to yet another aspect of the second stud, the second stud further includes a first surface, a second surface, a third surface, a fourth surface, a fifth surface, and a sixth surface. The sixth surface defines an irregular pentagon and extends radially inward from the second surface toward a planar side of the tip end and two vertical hollows of the tip end.

According to still another aspect of the second stud, the second stud further includes a first surface, a second surface, a third surface, a fourth surface, a fifth surface, a sixth surface, and a seventh surface. The seventh surface defines an irregular pentagon and extends radially inward from the third surface toward a planar side of the tip end and two vertical hollows of the tip end.

According to yet another aspect of the second stud, the bottom portion has a "saucer" configuration with an inclined surface extending radially inward from sides of the bottom portion and away from the tip end, the inclined surface having a tear-drop shape.

Definitions

The following definitions are controlling for the present invention.

"Axial" and "Axially" means the lines or directions that are parallel to the axis of rotation of the tire.

"Axially Inward" means in an axial direction toward the equatorial plane.

"Axially Outward" means in an axial direction away from the equatorial plane.

"Bead" or "Bead Core" generally means that part of the tire comprising an annular tensile member of radially inner beads that are associated with holding the tire to the rim.

"Belt Structures" or "Reinforcement Belts" or "Belt Package" means at least two annular layers or plies of parallel cords, woven or unwoven, underlying the tread, unanchored to the bead, and having both left and right cord angles in the range from 18 degrees to 30 degrees relative to the equatorial plane of the tire.

"Carcass" means the tire structure apart from the belt structure, tread, undertread over the plies, but including the beads.

"Circumferential" means circular lines or directions extending along the perimeter of the surface of the annular tread perpendicular to the axial direction; it can also refer to the direction of the sets of adjacent circular curves whose radii define the axial curvature of the tread, as viewed in cross section.

"Directional Tread Pattern" means a tread pattern designed for specific direction of rotation.

"Equatorial Plane" means the plane perpendicular to the tire's axis of rotation and passing through the center of its tread; or the plane containing the circumferential centerline of the tread.

"Footprint" means the contact patch or area of contact of the tire tread with a flat surface under normal load pressure and speed conditions.

"Groove" means an elongated void area in a tread that may extend circumferentially or laterally in the tread in a straight, curved or zigzag manner. It is understood that all groove widths are measured perpendicular to the centerline of the groove.

"Hertz" means number of cycles per second.

"Lateral" means a direction going from one sidewall of the tire towards the other sidewall of the tire.

"Net to gross" means the ratio of the net ground contacting tread surface to the gross area of the tread including the ground contacting tread surface and void spaces comprising grooves, notches and sipes.

"Notch" means a void area of limited length that may be used to modify the variation of net to gross void area at the edges of blocks.

"Ply" means a cord-reinforced layer of rubber coated radially deployed or otherwise parallel cords.

"Radial" and "radially" mean directions radially toward or away from the axis of rotation of the tire.

"Radial Ply Tire" means a belted or circumferentially-restricted pneumatic tire in which at least one ply has cords which extend from bead to bead are laid at cord angles between 65 degrees and 90 degrees with respect to the equatorial plane of the tire.

"Shoulder" means the upper portion of sidewall just below the tread edge.

"Sidewall" means that portion of a tire between the tread and the bead.

"Sipe" means a groove having a width in the range of 0.2 percent to 0.8 percent of the tread width. Sipes are typically formed by steel blades having a 0.4 to 1.6 mm, inserted into a cast or machined mold.

"Tangential" and "Tangentially" refer to segments of circular curves that intersect at a point through which can be drawn a single line that is mutually tangential to both circular segments.

"Tread" means the ground contacting portion of a tire.

"Tread width" (TW) means the greatest axial distance across the tread, when measured (using a footprint of a tire,) laterally from shoulder to shoulder edge, when mounted on the design rim and subjected to a specified load and when inflated to a specified inflation pressure for said load.

"Vertical" means in the radial direction of the tire.

"Void Space" means areas of the tread surface comprising grooves, notches and sipes.

BRIEF DESCRIPTION OF THE DRAWINGS

The present invention will be better understood through reference to the following description and the appended drawings, in which.

DETAILED DESCRIPTION OF EXAMPLES OF THE PRESENT INVENTION

Figure 1:
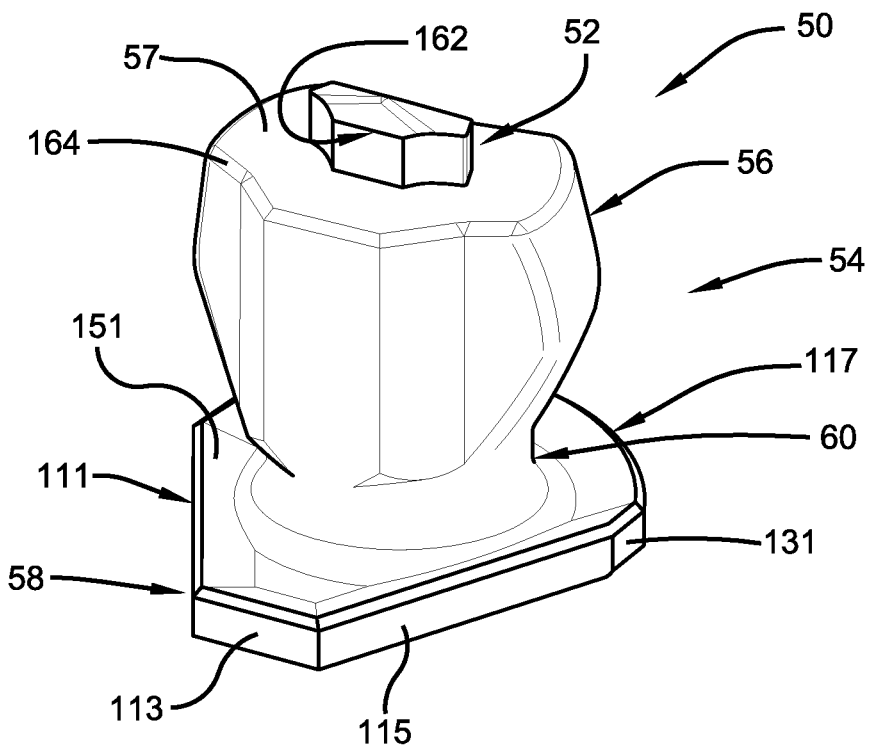
FIG. 1 schematically represents an external perspective view of a stud in accordance with the present invention.

The following is an explanation of a pneumatic or non-pneumatic tire assembly according to the present invention. The assembly may be similar to the pneumatic tire configuration disclosed in U.S. Pat. No. 10,035,382, herein incorporated by reference in its entirety. FIG. 1 of U.S. Pat. No. 10,035,382 schematically represents a tire cross-sectional view illustrating a cross-section of a pneumatic tire. The pneumatic tire may be a tire with studs embedded in a tread portion of the pneumatic tire, as disclosed in U.S. application Ser. No. 16/166,207 to Pons et al., filed on Oct. 22, 2018, herein incorporated by reference in its entirety.

The tire circumferential direction explained hereafter refers to the rotation direction (both rolling directions) of a tread surface of a studded tire about a tire rotation axis. The radial direction of the tire refers a direction radiating about a direction extending orthogonally to/from the tire rotation axis. The outer side in the radial direction of the studded tire may refer to the side away from the tire rotation axis in the radial direction of the studded tire. The tire width direction may be a direction parallel to the tire rotational axis, and the outer side in the tire width direction may refer to two sides away from a tire center line of the studded tire.

A studded tire in accordance with the present invention may include a carcass ply layer, a belt layer, and bead cores, which serve as a frame for the studded tire. The studded tire may further include a tread member, sidewall members, bead filler members, rim cushion members, and an innerliner member, around the frame for the studded tire.

The carcass ply layer may be formed in a toroidal shape wound between a pair of circular ring-shaped bead cores and may include rubber coated organic fiber carcass ply members. The carcass ply layer may be configured from multiple carcass ply members or a single carcass ply member. The belt layer may be provided on the outer side in the tire radial direction of the carcass ply layer, configured from two belt members. The belt layer may be constructed of rubber-coated steel cords arranged at a predetermined angle, such as 20 to 30 degrees, relative to the tire circumferential direction. The inclination direction of the steel cords of the two layers of the belt members may be opposite each other.

The tread member may be disposed on an outer side in the tire radial direction of the belt layer. The sidewall members may be connected to two sides of the tread member to form two sidewalls. The tread member may be configured from two layers of rubber, an upper tread member disposed on an outer side in the tire radial direction and a lower tread member disposed on an inner side in the tire radial direction. The rim cushion members may be disposed at inner sides in the tire radial direction of the sidewall members and come into contact with a rim on which the studded tire may be fitted. A bead filler material may be disposed between a portion of the carcass ply layer before the carcass ply layer is wound around the bead cores and a portion of the carcass ply layer. The innerliner member may be disposed on an inner surface of the studded tire adjacent a tire cavity region that is filled gas enclosed by the studded tire and the rim. The studded tire may have this tire structure or any other suitable structure, pneumatic and/or non-pneumatic.

Figure 2:
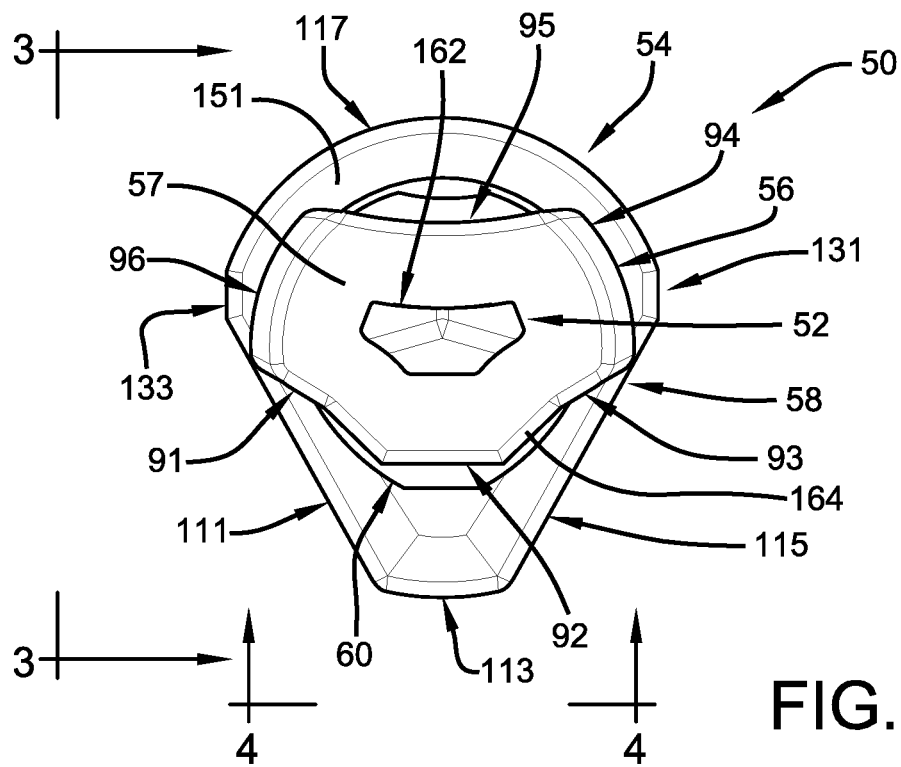
FIG. 2 schematically represents an external orthographic radial view of the stud of FIG. 1.
Figure 3:
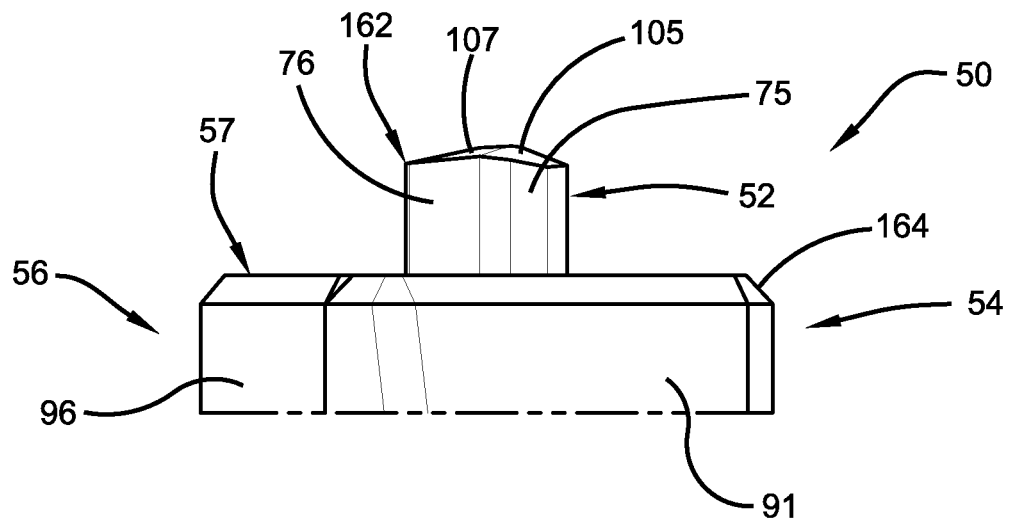
FIG. 3 schematically represents a sectional view taken along line "3-3" of part of the stud of FIG. 2.
Figure 4:
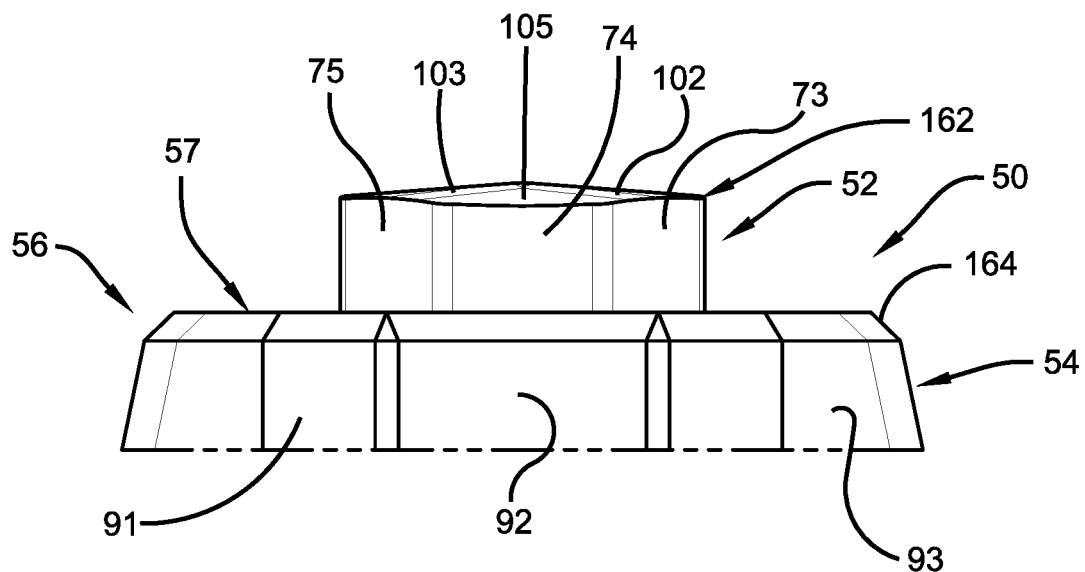
FIG. 4 schematically represents a sectional view taken along line "4-4" of part of the stud of FIG. 2.

FIG. 1 shows an external perspective view of a stud 50 in accordance with the present invention. FIG. 2 shows a radially inward view of the stud 50 of FIG. 1. FIGS. 3 and 4 show side views of the stud 50 of FIGS. 1 and 2. The stud 50 may include a radially outer tip end 52 and a base 54 for partially inserting into corresponding recesses in the tread member. The base 54 may thus be partially embedded inside a stud pin installation hole in the tread portion of the tire 10 in which it is installed. The stud 50 may be secured to the tire by side surfaces of the stud pin installation hole pressing and clamping onto part of the base 54. The base 54 may include chamfered edges 164 for enhancing engagement with the tread element. The tip end 52 may also have chamfered edges 162 for enhancing engagement with the ice surface.

The base 54 may include a stump portion 56, a bottom portion 58, and a shank portion 60 radially interconnecting the bottom portion and the stump portion. The bottom portion 58 may be located at the radially opposite end of the stump portion 56 and the tip end 52. The stud 50 may thus be formed from the bottom portion 58, the shank portion 60, and the stump portion 56 in that radially ascending order.

Figure 5:
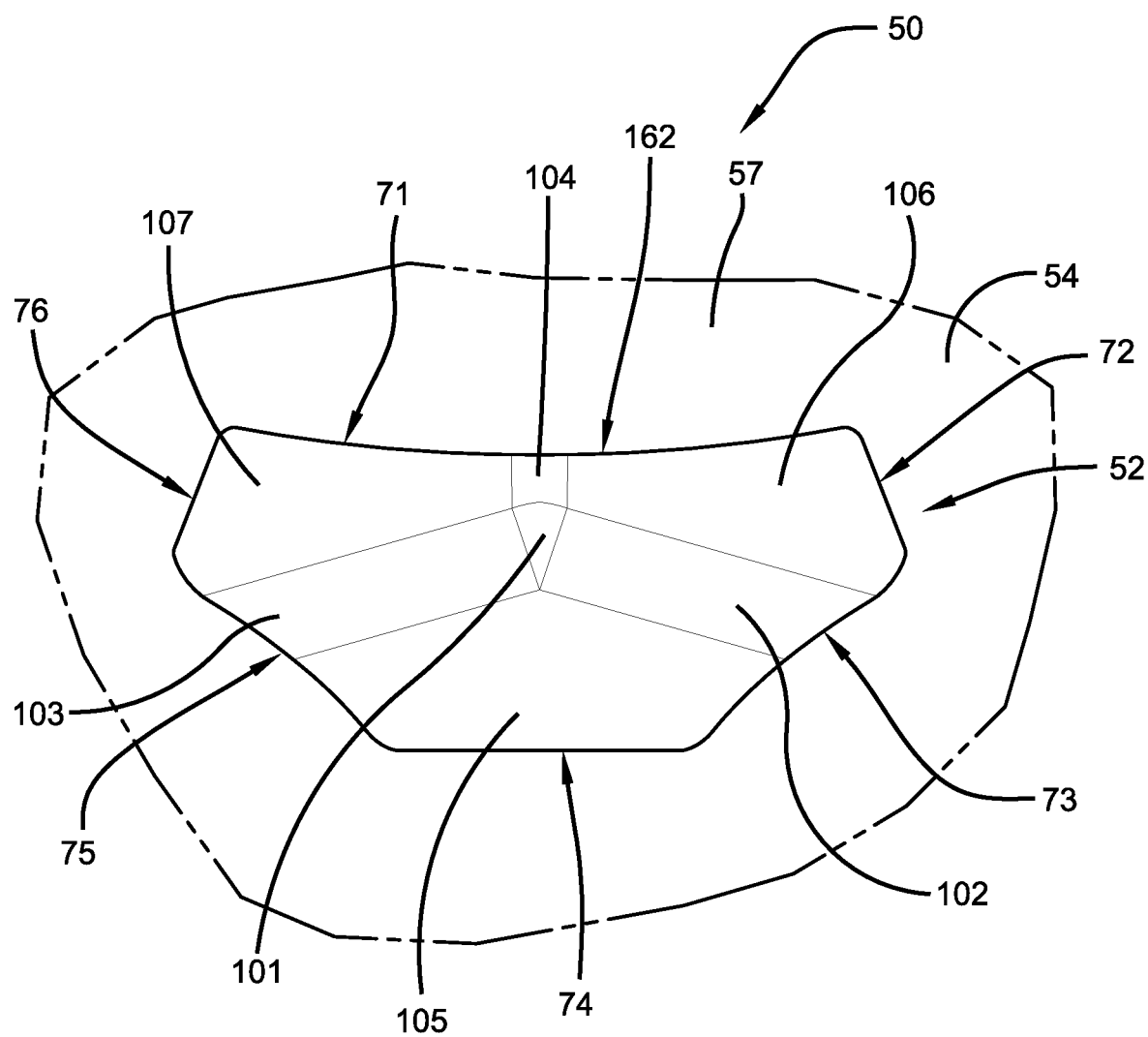
FIG. 5 schematically represents an orthogonal detail of the outer tip end of the stud of FIG. 1.

As illustrated in FIGS. 1 through 4, when the stud 50 is installed in the tread portion, the tip end 52 is the portion of the stud 50 that may protrude radially from the tread surface, contact the road surface, and claw into ice and/or snow. The tip end 52 may have a hexagonal-like shape (FIGS. 2 and 5) extending radially outward from a radially outermost surface of the stump portion 56 of the base 54. The plan view of the tip end 52 may include three vertical, concave curved hollows 71, 73, 75 with three vertical, generally planar sides 72, 74, 76. That is, the outer peripheral surface of the tip end 52 may comprise three vertical cavities 71, 73, 75 and three vertical generally flat sides 72, 74, 76 (FIGS. 2 and 5). Other suitable numbers of cavities and sides may be configured for the tip end 52.

The stump portion 56 may be a flange located between the tip end 52 and the shank portion 60. In other words, the tip end 52 may be formed radially extending outward from the flat radially outer surface 57 of the stump portion 56. When this stud 50 is installed in the tire, the stump portion 56 may be embedded inside the tread member. The shape of the stump portion 56 may be similarly shaped to the tip end 52 with a flat side 92 circumferentially between two concave hollows 91, 93 and two convex sides 94, 96 circumferentially separated by a third concave hollow 95. The outer peripheral surface 91, 92, 93, 94, 95, 96 of the stump portion 56 may contact and press against the inside surface of the installation holes of the tread member, as is conventionally known. The cross-section of the stump portion 56 may alternatively be substantially triangular, quadrilateral, pentagonal, hexagonal (FIGS. 2 and 5), or other polygonal shape.

The bottom portion 58 may be a flange located opposite the tip end 52. The cross-section of the bottom portion 58 may be mainly a tear-drop shape with three vertical, planar sides 111, 113, 115 and one vertical, semicircular side 117 (FIG. 2). Two small vertical, planar surfaces 131, 133 may interconnect the planar side 111 and the semicircular side 177; and the planar side 115 and the semicircular side 117, respectively. The cross-section of the bottom portion 58 may alternatively be a substantially triangular, quadrangular, pentagonal, or hexagonal shape. Thus, the tip end 52, stump portion 56, and bottom portion 58 each form a generally arrowhead shape with each of the arrowheads pointing in the same direction (downward in FIG. 2).

The bottom portion 58 may further include a "saucer" configuration with an inclined surface 151 extending radially inward from the sides 111, 113, 115, 117 away from the tip end 52. Thus, the inclined surface 151 takes on the tear-drop shape of the bottom portion 58, or whatever the shape of the bottom portion.

Generally, the bottom portion 58 may be inserted into a corresponding similarly tear-drop shaped stud pin installation hole in the tread member of the tire 10 thereby securing the orientation of the stud 50 and preventing rotation of the stud during use. Alternatively, the stud pin installation hole may be circular or other suitable shape allowing the bottom portion 58 to be secured against rotation.

The shank portion 60 may connect the stump portion 56 and the bottom portion 58. The shank portion 60 may have a smaller, or thinner, cross-section compared to the stump portion 56 and the bottom portion 58. The cross-section of the shank portion 60 may be generally oval-shaped (FIG. 1).

In accordance with the present invention, the radially outermost surface of the tip end 52 may have seven generally planar, angled surfaces. These may be a first surface 101, a second surface 102, a third surface 103, a fourth surface 104, a fifth surface 105, a sixth surface 106, and a seventh surface 107 (FIG. 5). The first surface 101 may define an irregular quadrilateral and extend radially inward from the fourth surface 104 toward the planar side 74. The second surface 102 may define an irregular quadrilateral and extend radially inward from the first surface 101 toward the hollow 73. The third surface 103 may define an irregular quadrilateral and extend radially inward from the first surface 101 toward the hollow 75. The fourth surface 104 may define an irregular pentagon and extend radially inward from the first surface 101 toward the hollow 71. The fifth surface 105 may define an irregular pentagon and extend radially inward from the first, second, and third surfaces 101, 102, 103 toward the planar side 74 and the hollows 73, 75. The sixth surface 106 may define an irregular pentagon and extend radially inward from the second surface 102 toward the planar side 72 and the hollows 71, 73. The seventh surface 107 may define an irregular pentagon and extend radially inward from the third surface 103 toward the planar side 76 and the hollows 71, 75. Such a surface 101-107 may facilitate engagement of the tip end 52 with an ice surface during rotation of the tire under load.

The tip end 52 and the base 54 may be constructed of the same metallic material or from different metallic materials. For example, the tip end 52 and the base 54 may be made from aluminum. The tip end 52 may be made from tungsten carbide and the base 54 may be made from aluminum. If the tip end 52 and the base 54 are made from different metallic materials, the tip end 52 may be fixed to the base 54 by pushing and interference fitting a projection (not shown) of the tip end 52 radially inward into a hole (not shown) of the stump portion 56 of the base 54.

If the side surface of the stud installation hole is in contact with the semicircular side 117 of the bottom portion 58 when the stud 50 enters a cylindrical stud pin installation hole in the tire 10, the planar side 113 opposite the semicircular side 117 of the bottom portion 58 may dig into the opposite side surface of the cylindrical stud pin installation hole of the tread member thereby inhibiting the bottom portion 58, and the entire stud 50, from rotating during use. Generally, no matter the shape of the stud installation hole, the rubber of the tread member may conform to the shape and various surfaces of the stud 50 to secure the stud to the tread member.

The tip ends of the studs of the tire and configurations of such tip ends according to the present invention have been described above in exemplary detail. However, a tire, a stud, and/or configuration according to the present invention may not be limited to the above examples and may be modified and given various substitutions in accordance with the spirit and the scope of the present invention.

What is claimed:

1. A stud configured to be inserted into a tread portion of a tire, the stud comprising:
    a tip end protruding from the tread portion for contacting a surface, the tip end comprising a radially outer portion with a first surface, a second surface, a third surface, a fourth surface, a fifth surface, a sixth surface, and a seventh surface, the first surface defining a quadrilateral and extending radially inward from the fourth surface toward a planar side of the tip end; and
    a base including a flanged bottom portion provided on an end opposite the tip end and extending radially outward, a stump portion provided between the bottom portion and the tip end, and a shank portion interconnecting the stump portion and the bottom portion,
    the base being embedded and secured in the tread portion of the tire in which the stud is installed, the bottom portion having a tear-drop shape comprising three planar sides and one semi-cylindrical side,
    the second surface defining a quadrilateral, the third surface defining a quadrilateral, the fourth surface defining a pentagon, the fifth surface defining a penta-gon, the sixth surface defining a pentagon, and the seventh surface defining a pentagon,
    the second surface extending radially inward from the first surface toward a first vertical hollow of the tip end, the third surface extending radially inward from the first surface toward a second vertical hollow of the tip end, the fourth surface extending radially inward from the first surface toward a third vertical hollow of the tip end.

2. The stud as set forth in claim 1 wherein the fifth surface defines a pentagon and extends radially inward from the first, second, and third surfaces toward a planar side of the tip end and the first and second vertical hollows of the tip end.

3. The stud as set forth in claim 2 wherein the sixth surface defines a pentagon and extends radially inward from the second surface toward a planar side of the tip end and the first and third vertical hollows of the tip end.

4. The stud as set forth in claim 3 wherein the seventh surface defines a pentagon and extends radially inward from the third surface toward a planar side of the tip end and the second and third vertical hollows of the tip end.

5. The stud as set forth in claim 1 wherein the bottom portion has a "saucer" configuration with an inclined surface extending radially inward from sides of the bottom portion and away from the tip end, the inclined surface having a tear-drop shape.

6. The stud as set forth in claim 1 wherein the bottom portion has a configuration such that an inclined surface extends radially inward from sides of the bottom portion and away from the tip end.

7. A stud configured to be inserted into a tread portion of a tire, the stud comprising:
    a tip end protruding from the tread portion for contacting a surface; and
    a base including a flanged bottom portion provided on an end opposite the tip end and extending radially outward, a stump portion provided between the bottom portion and the tip end, and a shank portion interconnecting the stump portion and the bottom portion,
    the base being embedded and secured in the tread portion of the tire in which the stud is installed, the bottom portion having a tear-drop shape comprising three planar sides and one semi-cylindrical side,
    the bottom portion of the base having a "saucer" configuration such that an inclined surface extends radially inward from vertical sides of the bottom portion away from the tip end such that the inclined surface takes on the tear-drop shape of the bottom portion
    the stud further including a first surface of the tip end and a second surface of the tip end, the second surface defining a quadrilateral and extending radially inward from the first surface toward the vertical hollow of the tip end.

8. The stud as set forth in claim 7 further including a third surface of the tip end defining a quadrilateral and extending radially inward from the first surface toward a vertical hollow of the tip end.

9. The stud as set forth in claim 7 further including a third surface of the tip end and a fourth surface of the tip end, the fourth surface defining a pentagon and extending radially inward from the first surface toward a vertical hollow of the tip end.

10. The stud as set forth in claim 7 further including a third surface of the tip end, a fourth surface of the tip end, and a fifth surface of the tip end, the fifth surface defining a pentagon and extending radially inward from the first, second, and third surfaces toward a planar side of the tip end and two vertical hollows of the tip end.

11. The stud as set forth in claim 7 further including a third surface of the tip end, a fourth surface of the tip end, a fifth surface of the tip end, and a sixth surface of the tip end, the sixth surface defining a pentagon and extending radially inward from the second surface toward a planar side of the tip end and two vertical hollows of the tip end.

12. The stud as set forth in claim 7 further including a third surface of the tip end, a fourth surface of the tip end, a fifth surface of the tip end, a sixth surface of the tip end, and a seventh surface of the tip end, the seventh surface defining a pentagon and extending radially inward from the third surface toward a planar side of the tip end and two vertical hollows of the tip end.

13. The stud as set forth in claim 7 wherein the bottom portion has a "saucer" configuration with an inclined surface extending radially inward from sides of the bottom portion and away from the tip end, the inclined surface having a tear-drop shape.

\* \* \* \* \*